Dec. 23, 1941.   R. N. CONWELL ET AL   2,266,851
CONTROL METHOD AND APPARATUS
Original Filed Dec. 17, 1935   3 Sheets-Sheet 1

Inventors
ROLLIN N. CONWELL
AND ALBERT S. BROOKES
By Semmes & Semmes
Attorneys

Dec. 23, 1941.    R. N. CONWELL ET AL    2,266,851
CONTROL METHOD AND APPARATUS
Original Filed Dec. 17, 1935    3 Sheets-Sheet 2
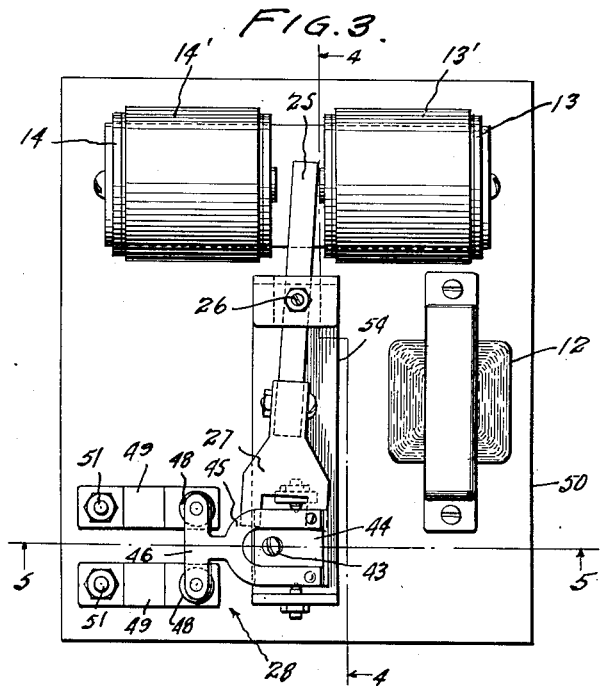
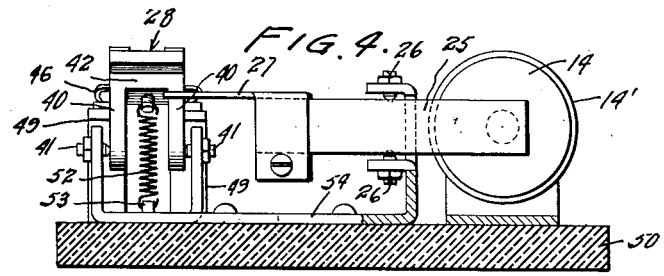
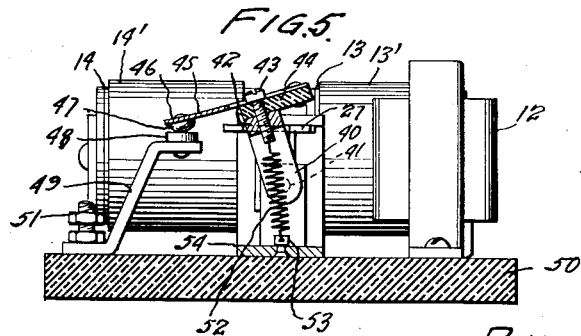
Inventors
ROLLIN N. CONWELL
AND ALBERT S. BROOKES
By Semmes & Semmes
Attorneys Dec. 23, 1941.   R. N. CONWELL ET AL   2,266,851
CONTROL METHOD AND APPARATUS
Original Filed Dec. 17, 1935   3 Sheets-Sheet 3
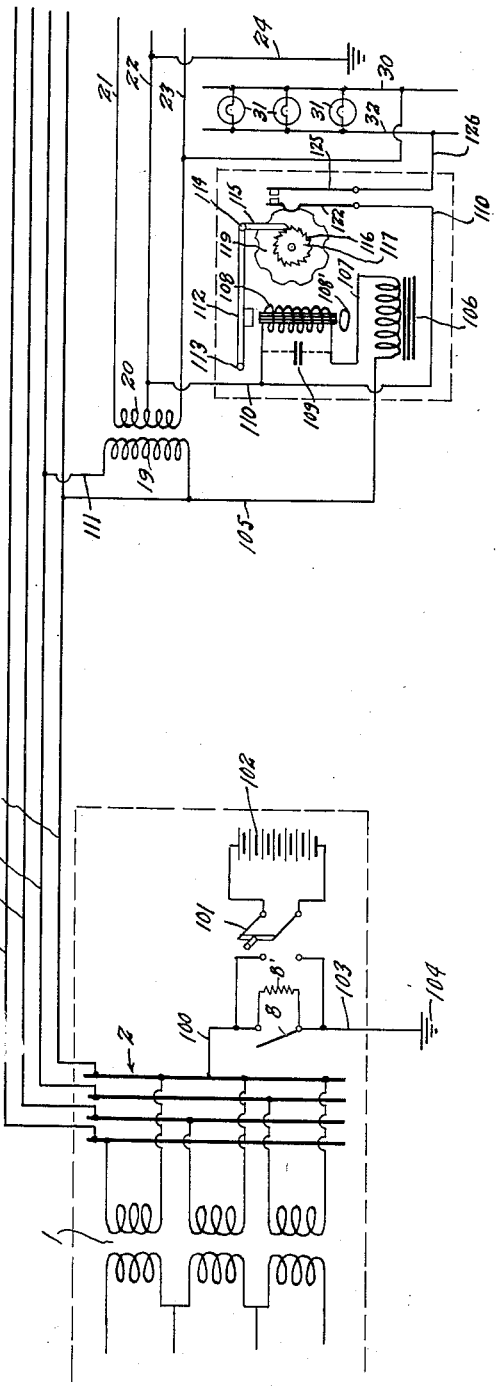
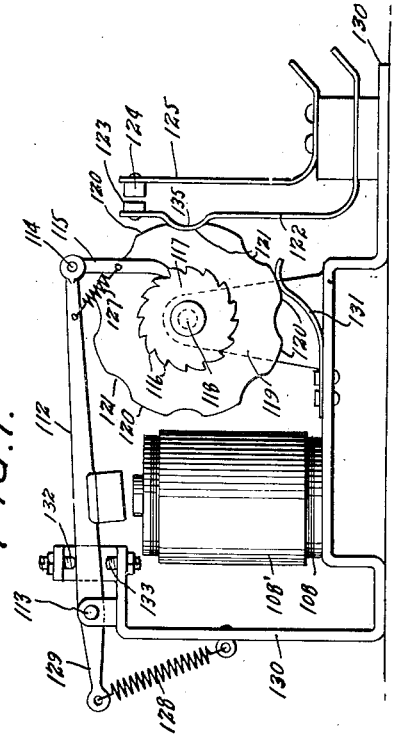
Inventors
ROLLIN N. CONWELL
AND ALBERT S. BROOKES
By Semmes & Semmes
Attorneys Patented Dec. 23, 1941

2,266,851

UNITED STATES PATENT OFFICE 2,266,851

CONTROL METHOD AND APPARATUS

Rollin N. Conwell, Bloomfield, and Albert S. Brookes, Newark, N. J.

Continuation of application Serial No. 54,958, December 17, 1935. This application May 16, 1938, Serial No. 208,300

11 Claims. (Cl. 171—97)

Our invention relates to systems of remote control of loads on polyphase alternating-current power distribution systems. This application is a true continuation of our co-pending application Serial No. 54,958, filed December 17, 1935.

It is particularly applicable for remote control of loads such as multiple street lights and storage hot water heaters. Our system will furnish remote control for many types of electrical apparatus such as the multiple street lights and storage hot water heaters above mentioned, as well as other types of load which are generally connected to secondary mains fed from the usual distribution transformer. Among the advantages of the system is that it furnishes a low cost and positive control for electrical apparatus which it is desired to operate from some remote point.

Where a multiple system of street lighting is used, such as in the suburban districts of cities, it almost invariably happens that there is not sufficient load to warrant the running of feeders exclusively for street lighting. Consequently these lights are connected to the service or house lighting feeders. House lighting service must be continuous. Therefore, the problem of turning the street lights on and off immediately presents itself. Switches that are operated by clock mechanism are unreliable for this work, as they are in the case of storage hot water heaters or other types of heating load.

For the remote control of loads on polyphase alternating-current lines there have been heretofore suggested the use of 60-cycle control current and relays, or carrier-current operated relays using say 480- or 720-cycle current. The 60-cycle alternating-current control system is subject to false operation by stray alternating currents under conditions not at all unusual in power distribution systems. For example, induced voltages from the power line to the control wire due to fault conditions or unbalanced loads would cause 60-cycle alternating current to flow in the control wire and hence cause false operation of the relays. In the carrier-current system relatively complex and expensive control units are required, and the starting of heavy equipment or fault conditions may give rise to harmonics which cause false operation of the relays.

An object of our invention is to permit remote control of electrical apparatus to be accomplished over a control wire such as a pilot wire or the neutral of a four-wire system.

Another object of our invention is to provide a system which is positive in operation, economical to construct and maintain and which will furnish a system of positive control of remotely located apparatus.

In accordance with the present invention direct-current actuated relays and direct-current control is employed for the remote control of loads on a polyphase alternating-current distribution system. Means are provided for sufficiently limiting or substantially preventing alternating current from flowing through the relays and thereby affecting the operation of the relays. The use of direct-current relays and direct-current control, in combination with means for preventing alternating current from flowing through the relays, renders the present system free from false operation by alternating currents which may be induced in the control wire or directly impressed thereon by unbalanced or fault conditions on the power line.

With these and other objects in view, which may be incident to our improvements, the invention consists in the parts and combinations to be hereinafter set forth and claimed, with the understanding that the several necessary elements comprising our invention may be varied in construction, proportions and arrangement, without departing from the spirit and scope of the appended claims.

In order to make our invention more clearly understood, we have shown in the accompanying drawings means for carrying the same into practical effect without limiting the improvements in their useful applications to the particular constructions, which, for the purpose of explanation have been made the subject of illustration.

In the drawings:

Figure 3 is a top plan view of a polarized relay which we may use;

Figure 4 is a view taken along the line 4—4 of Figure 3, looking in the direction of the arrows;

Figure 5 is a view taken along the line 5—5 of Figure 3, looking in the direction of the arrows;

Figure 6 is a diagrammatic view of our system employing a three-phase four-wire distribution main and a sequence relay;

Figure 7 is a view in side elevation of a sequence relay which we may employ.

Figure 1:
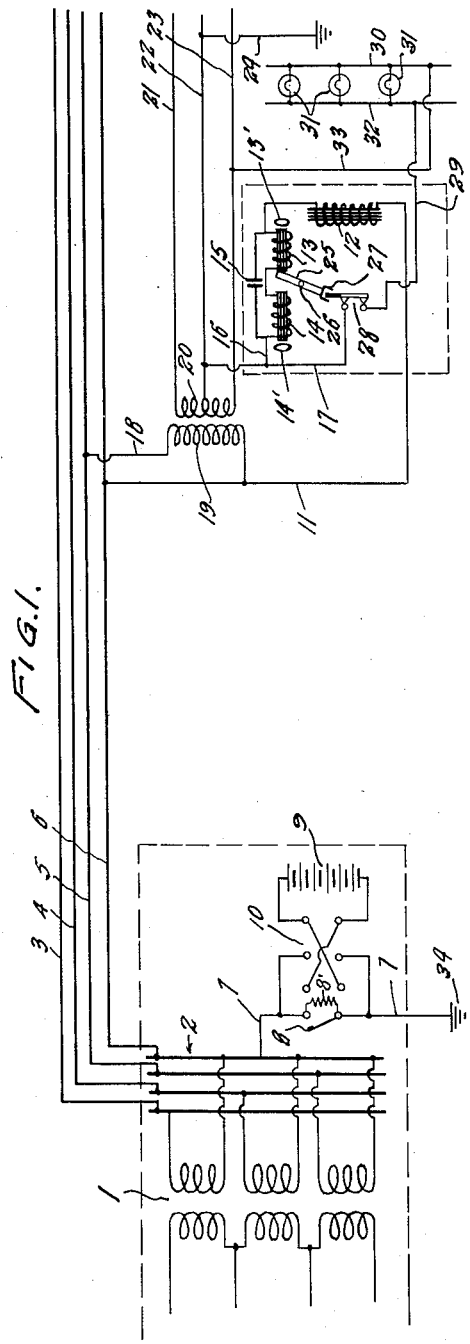
Figure 1 is a diagrammatic view of our system as applied to a three-phase four-wire distribution main employing a polarized relay as the controller.

Referring to the drawings, and particularly to Figure 1, numeral 1 represents a power transformer which feeds the power bus which we have indicated generally by the numeral 2, to which are connected wires 3, 4, 5 and a neutral wire 6 of a three-phase four-wire distribution circuit. Connected to the neutral wire 6 of the distribution circuit is a wire 7 which is connected to the usual neutral grounding switch 8 and thence to ground.

There is a source of direct current supply which we have indicated by the numeral 9 that is connected through a reversing switch 10 to the neutral wire 6 and ground of the distribution circuit. In operation, it is to be understood that the grounding switch must be opened to permit the system of remote control to work. A resistor 8' of sufficiently high resistance to avoid an excessive drain on the direct current supply is connected across the terminals of the switch 8.

At the locality where the remote control must be exercised, we have connected to neutral wire 6 a lead 11 which passes through a choke coil 12 and thence through actuating coils 13 and 14 of a polarized relay or controller. Each of the actuating coils 13 and 14 is provided with short circuiting turns 13' and 14' respectively. We may connect across the actuating coils a condenser 15. From the actuating coils there is a line 16 which connects to a line 17.

Connecting the wire 5 to the wire 11 is a line 18 containing the primary 19 of a distribution transformer. A secondary 20 of the transformer is connected to conductors 21, 22 and 23 of the secondary feeder main. The conductor 22 is connected to ground through a lead 24, as shown.

The actuating coils 14 and 13 are adapted one to repel and the other to attract a permanent magnet 25 which is pivoted at 26, and which is adapted through a yoke 27 to open or close a switch 28. The switch 28 is connected to the lead 17 which connects to the line 22.

The switch is also connected to a lead 29 which is connected to a lead 32 of multiple street lights 31. Lead 30 of the multiple street lights is connected through a wire 33 to wire 23 of the secondary feeder main.

In operation, the grounding switch 8 is open and the reversing switch 10 is operated to send direct current in either desired direction along the neutral wire 6 of the distribution circuit. Current flows through neutral conductor 6, through lead 11, through choke 12, through actuating coils 13 and 14 of the polarized relay, through lead 17 to wire 22, to wire 24 and thence to ground, whence the circuit is completed through a ground 34 connected to lead 7. Depending upon which way the reversing switch 10 is thrown, the direct current will operate on the polarized relay to open or close the switch 28, turning on or turning off the lights 31 of the multiple street light circuit.

The choke coil 12 limits the flow of alternating current through the polarized relay. The short circuited turns 13' and 14' on the actuating coils 13 and 14, respectively, of the polarized relay render the effect of any alternating current which may get through negligible. Further, the condenser which may optionally be connected across the coils 13 and 14 further renders negligible the effect of the alternating current on the polarized relay. Where we use the term "polarized relay" we of course intend to refer to polarized controllers in general and not be limited to the narrow meaning of the term relay.

In Figures 3, 4 and 5 we have shown details of the polarized relay which we may employ. In general we have given a description of the polarized relay, but it is believed to be useful to give somewhat more of a detailed description of certain of the parts. The switch, which we have generally indicated by the numeral 28, comprises support members 40 pivoted as indicated at 41. On the top of the support members 40 is a connecting bar 42 which is attached by means of the bolt 43 to an insulating block 44. The insulating block 44 is adapted to carry a contact element 45 having a connecting bar 46 having contacts 47 thereon. Contacts 47 are adapted to contact adjacent contacts 48 mounted on conductor brackets 49 which are connected to the support base 50. Binding posts 51 are used to connect the leads 17 and 29 to the polarized relay.

Each of the brackets 49 is insulated from the other bracket. With the position of the parts shown as in Figure 5, an electrical circuit will be completed through each bracket 49, contacts 48, contacts 47 and connecting bar 46. The yoke 27 is adapted to pivot the supports 40 about the pivots 41 to either make or break the circuit. The bolt 43 has attached to it a tension spring 52 which is attached as indicated at 53 to the base of a support bracket 54 upon which the permanent magnet 25 is pivoted at 26. The construction is such that the tension of the spring 52 is in a direction which is off center from the pivot point 41 of the switch in either the "on" or the "off" position of the switch. The spring 52 therefore tends to hold the switch either in the "on" or "off" position. After the permanent magnet 25 has been actuated to set the switch, the switch will remain in the position set until the permanent magnet 25 is actuated in the other direction to change the switch setting.

Figure 2:
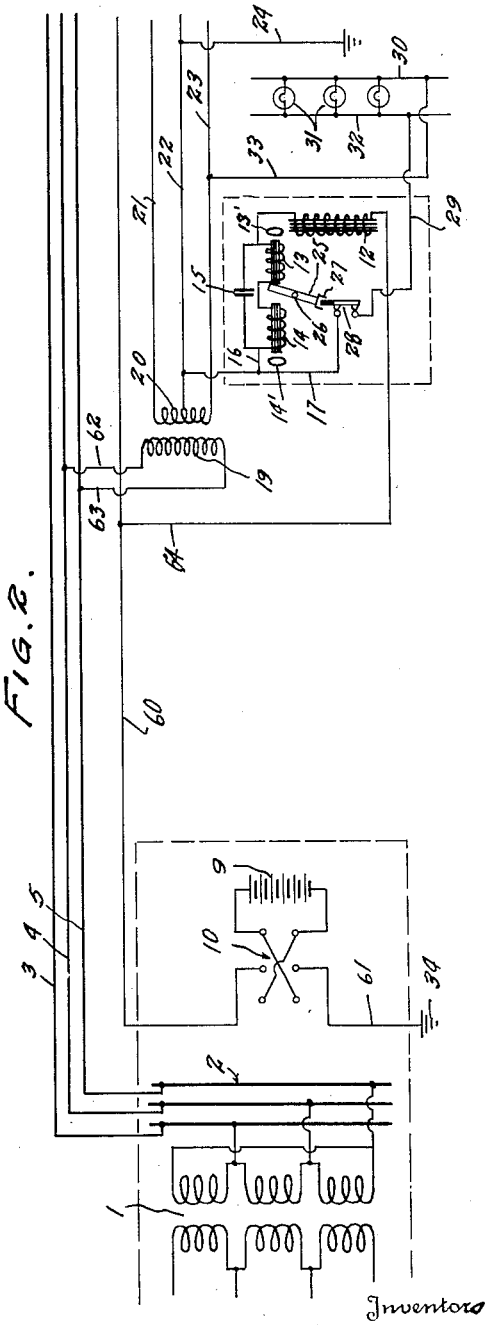
Figure 2 is a diagrammatic view of our system, showing a three-phase three-wire distribution main, and a pilot wire system of control using a polarized relay as the controller.

Referring to Figure 2, we have shown a system as applied to a three-phase three-wire distribution circuit rather than a three-phase four-wire distribution circuit. With the three-wire distribution circuit, we employ instead of the neutral wire 6 a pilot wire 60, which connects to reversing switch 10 and through a lead 61 to the ground 34. In this system the primary 19 of the distribution transformer is connected to wires 4 and 5 through leads 62 and 63. There is a lead 64 to the pilot wire 60 which corresponds to lead 11 of the system shown in Figure 1. The remainder of the connections are the same.

In this form of system the operation of the polarized relay or controller for turning on or off the multiple street lights, storage hot water heaters, or other desired apparatus, is effected through the pilot wire by the reversing switch 10.

In Figs. 1 and 2 the neutral wire or pilot wire, respectively, is connected to ground 104 at the control station, so that in either case the control wire is at a relatively low potential with respect to ground. Hence the relay and associated equipment at the distant station are required to withstand only relatively low voltage and are therefore relatively inexpensive. In accordance with usual practice, the neutral 6 or pilot wire 60 will be strung on the same poles or carried in the same underground duct as the power wires, 3, 4, 5, so that the control wire is in proximity with the power line for a substantial portion of the distance from the control station to the distant station.

The choke coil 12, short-circuit turns 13', 14', and condenser 15 (if used) offer a much greater impedance to alternating current than to direct current and therefore serve to sufficiently limit or substantially prevent the flow of alternating current through the relay, thereby preventing alternating current induced in the control wire or otherwise impressed thereon from affecting operation of the relay and proper control of the load.

Instead of employing a polarized relay or controller, we may employ a sequence relay or a sequence controller. We have shown in Figure 6 a sequence relay or sequence controller which we have shown connected to a three-phase four-wire distribution system, in which the neutral wire is employed to effect the operation of the sequence relay at the distant point. It is obvious that a pilot wire could be used as was shown in the system illustrated in Figure 2, in case the three-phase distribution system should be a three-wire instead of a four-wire system.

In general, a pilot wire instead of a neutral wire may be used where the neutral is unavailable, or in cases where it is unsuitable for use. The unsuitability may arise from the presence of grounds at points other than at the station.

In the system illustrated in Figure 6, there is a lead 100 connected to a neutral wire 6 of the four-wire distribution circuit. The lead 100 is adapted to be connected through a switch 101 to a source of direct current 102. The switch 101 also connects the lead 103 to ground 104. There is illustrated the usual neutral grounding switch 8 which must be opened to permit of the remote control.

Connected to neutral wire 6 is a lead 105 in which is connected a choke coil 106 which, through lead 107, is connected to an actuating coil 108 of a sequence relay. The actuating coil 108 may have a condenser 109 connected across its ends, as illustrated in dotted lines. The actuating coil 108 is connected to a lead 110 which is connected to the wire 22 that is connected to the secondary 20 of the local transformer. The primary 19 of the distribution transformer is connected through a lead 111 to the wire 5 and to the lead 105.

There is provided a short circuited turn 108' for the actuating coil 108. Pivoted above the actuating coil 108 is an armature member 112 which is pivoted at 113. At the end of the armature member is pivoted at 114 a pawl 115 which is adapted to engage with ratchet teeth 116. The ratchet teeth 116 are on a ratchet wheel 117. The ratchet wheel 117 is attached to a disc 119 having flat cam surfaces 120 and hollowed out cam surfaces 121.

Adapted to bear against cam surfaces of the disc 119 is a spring member 122 which carries at its end a contact 123. The contact 123 is adapted to make or break contact with a contact 124 mounted on a support 125.

The spring element 122 and support 125 are connected respectively to leads 110 and a lead 126, which latter connects with the wire 32 of the multiple street lights 31.

Pawl 115 is held against the ratchet teeth 116 by means of a spring 127 (see Fig. 7). The armature 112 is held in the up position by means of a spring 128 which is attached to an extension 129 of the armature at one end and at its other end to a bracket 130 upon which the armature is pivotally mounted at 113 and upon which the actuating coil 108 is also mounted.

A spring 131 is adapted to contact the cam faces of the disc 119 to furnish a frictional holding member for the disc to prevent accidental displacement of the disc from its adjusted position.

The operation of the sequence relay is very simple. The limiting position of the armature 112 is controlled by an adjusting nut 132 which limits the upper position, and adjusting nut 133 which limits its lower position. When the armature 112 is moved in its "down" position, the pawl 115 engages a ratchet tooth 116 and moves the ratchet 117 clockwise, looking at the parts in the position shown in Figure 7. Upon cessation of flow of current in the actuating coil 108, spring 128 pulls the armature 112 into its "up" position. Springs 131 or 122 hold the disc 119 in the position which it has taken after being moved by the armature 112. It is to be noted that when the spring 131 is riding on a flat surface 120 of the disc 119, the spring 122 has its bentout portion 135 lying within one of the depressions 121 of the disc 119. When the portion 135 of the spring is lying on one of the faces 120, the spring 131 is lying within one of the depressions 121 of the disc 119; thus the disc 119 will be held in its adjusted position.

When the portion 135 of the spring 122 lies on the surface 120, contact is made between contacts 123 and 124. This causes current to flow through lead 110 through the contacts 123 and 124 to lead 126 through the multiple street lights and back through a lead 140 to wire 23, thus causing the lights to go on. On the next move of the sequence relay under an impulse sent out by closing the switch 101, the circuit above described is broken by parting of the contacts 123 and 124.

From the above description it will be apparent that by closing the switch 101 the direct current from the direct current source 102 will in sequence open and close, and open and close the circuit which controls the street lights 31.

Throughout the specification, where we have used the term "polarized relay," we also refer to "polarized controller," and where we have used the term "sequence relay" we also refer to a "sequence controller." A polarized relay is a relay which will close its contacts when direct current is caused to flow through it in one direction and open its contacts when current is caused to flow through it in the reverse direction. The selecting mechanism may be through the use of permanent magnets or through the use of rectifying elements in series or parallel with the relay coils.

By "sequence relay" is meant a relay which closes the contacts on the first impulse or series of impulses and opens the contacts on some following impulse or series of impulses. The various aforesaid impulses may be similar or they may differ in polarity, magnitude or duration, or any combination of these characteristics.

While we have shown and described the preferred embodiment of our invention, we wish it to be understood that we do not confine ourselves to the precise details of construction herein set forth, by way of illustration, as it is apparent that many changes and variations may be made therein, by those skilled in the art, without departing from the spirit of the invention, or exceeding the scope of the appended claims.

We claim:

1. In a polyphase alternating current power distribution system, a system for the remote control of loads from a distant control station comprising a control wire extending from the control station to a distant station at which control is to be effected, a load, a switch for connecting said load to said alternating current power distribution system at said distant station, a direct current actuated relay at said distant station connected in circuit with said control wire and adapted to operate said switch, means at said control station for impressing direct current on said control wire to thereby control the operation of said relay at the distant station, and means for substantially preventing alternating current, due to voltages induced in the control wire or abnormal conditions on the power system from flowing through said relay and thereby affecting the operation thereof.

2. In a polyphase alternating current power distribution system, a system for the remote control of loads from a distant control station comprising a control wire extending from the control station to a distant station at which control is to be effected, a load, a switch for connecting said load to said alternating current power distribution system at said distant station, a direct current actuated sequence relay at said distant station connected in circuit with said control wire and adapted to operate said switch, means at said control station for impressing direct current on said control wire to thereby control the operation of said relay at the distant station, and means for substantially preventing alternating current, due to voltages induced in the control wire or abnormal conditions on the power system from flowing through said relay and thereby affecting the operation thereof.

3. In a polyphase alternating current power distribution system, a system for the remote control of loads from a distant control station comprising a control wire extending from the control station to a distant station at which control is to be effected, a load, a switch for connecting said load to said alternating current power distribution system at said distant station, a polarized relay at said distant station connected in circuit with said control wire and adapted to open and close said switch, means at said control station for impressing direct current on said control wire alternatively in either direction to thereby operate said polarized relay, and means for substantially preventing alternating current, due to voltages induced in the control wire or abnormal conditions on the power system from flowing through said relay and thereby affecting the operation thereof.

4. In an alternating current power distributing system in which power is transmitted from a control station to a distant distribution station by a polyphase transmission line having a neutral wire, a system for the remote control of loads comprising a load, a switch for connecting said load to said alternating current power distribution system at said distant distribution station, a direct current actuated relay at said distant distribution station connected in circuit with the neutral wire of said polyphase transmission line and adapted to operate said switch, means at said control station for impressing direct current on said neutral wire to thereby operate said relay, and means for sufficiently limiting the flow of alternating current, due to unbalanced conditions in the polyphase system, through said relay to prevent said alternating current from affecting the actuation thereof.

5. In a polyphase alternating current power distribution system in which power is transmitted at a relatively high voltage and is transformed to a relatively low voltage at a distributing station for supplying loads therefrom, a system for the remote control of said loads from a distant control station on the high-voltage transmission line comprising a control wire extending from said control station on the high-voltage transmission line to a distant station on the low-voltage distributing line, a load, a switch for connecting said load to the low-voltage distributing line at said distant station, a direct current actuated relay at said distant station connected in circuit with said control wire and adapted to operate said switch, means at said control station for impressing direct current on said control wire to thereby control the operation of said relay at the distant station, and means for sufficiently limiting the flow of alternating current, due to voltages induced in the control wire or abnormal conditions on the power system, from flowing through said relay and thereby affecting the operation thereof.

6. In a polyphase alternating current power distribution system in which power is transmitted at a relatively high voltage and is transformed to a relatively low voltage at a distributing station for supplying loads therefrom, a system for the remote control of said loads from a distant control station on the high-voltage transmission line comprising a control wire extending from said control station on the high-voltage transmission line to a distant station on the low-voltage distributing line, said control wire having a relatively low potential with respect to ground, a load, a switch for connecting said load to the low-voltage distributing line at said distant station, a polarized relay at said distant station connected in circuit with said control wire and adapted to open and close said switch, means at said control station for impressing direct current on said control wire alternatively in either direction to thereby operate said polarized relay, and means for sufficiently limiting the flow of alternating current, due to voltages induced in the control wire or abnormal conditions on the power system, from flowing through said relay and thereby affecting the operation thereof.

7. In an alternating current power distribution system in which power is transmitted at a relatively high voltage from a control station to a distant distributing station by a polyphase transmission line having a neutral wire and is transformed at said distributing station to a relatively low voltage for supplying a load, a system for the remote control of said load comprising a switch for connecting said load to the low-voltage alternating current line from said distant distributing station, a direct current actuated relay at said distant distributing station connected in circuit with the neutral wire of said high voltage transmission line and adapted to operate said switch, means at said control station for impressing direct current on said neutral wire to thereby operate said relay, and means for sufficiently limiting the flow of alternating current, due to unbalanced conditions in the polyphase system, through said relay to prevent said alternating current from affecting the actuation thereof.

8. In a polyphase alternating current power distribution system in which power is transmitted at a relatively high voltage and is transformed to a relatively low voltage at a distributing station for supplying loads therefrom, a system for the remote control of said loads from a distant control station on the high-voltage transmission line comprising a pilot wire extending from said control station on the high-voltage transmission line to a distant station on the low-voltage distributing line, said pilot wire being grounded at said control station, a load, a switch for connecting said load to the low-voltage distributing line at said distant station, a polarized relay at said distant station adapted to open and close said switch, said polarized relay being connected in circuit between said pilot wire and ground, means at said control station for impressing direct current on said pilot wire alternatively in either direction to thereby control the operation of said polarized relay at the distant station, and means for substantially preventing alternating current, due to voltages induced in the pilot wire or abnormal conditions on the power system from flowing through said relay and thereby affecting the operation thereof.

9. In a polyphase alternating current power distribution system of relatively high voltage, a system for the remote control of loads from a control station on the high-voltage line comprising a control wire extending from the control station to a distant station at which control is to be effected, said control wire having a relatively low potential with respect to ground, a load, a switch for connecting said load to said alternating current power distribution system at said distant station, a direct-current-actuated relay at said distant station connected in circuit with said control wire and adapted to operate said switch, means at said control station for impressing direct current on said control wire to thereby control the operation of said relay at the distant station, and means rendering the impedance of the actuating circuit of said relay sufficiently greater for alternating current than for direct current to prevent alternating currents in the control wire due to induced voltages or abnormal conditions from affecting proper control of the load.

10. In a polyphase alternating current power distribution system, a system for the remote control of loads from a distant control station comprising a control wire extending from the control station to a distant station at which control is to be effected, said control wire being in proximity with the power distribution line for at least a substantial portion of the distance from the control station to the distant station, a load, a switch for connecting said load to said alternating current power distribution system at said distant station, a direct current actuated relay at said distant station connected in circuit with said control wire and adapted to operate said switch, means at said control station for impressing direct current on said control wire to thereby control the operation of said relay at the distant station, and means for substantially preventing alternating current, due to voltages induced in the control wire or abnormal conditions on the power system, from flowing through said relay and thereby affecting the operation thereof.

11. In a polyphase alternating current power distribution system of relatively high voltage, a system for the remote control of loads from a control station on the high-voltage line comprising a control wire extending from the control station to a distant station at which control is to be effected, said control wire being in proximity with the power distribution line for at least a substantial portion of the distance from the control station to the distant station and having a relatively low potential with respect to ground, a load, a switch for connecting said load to said alternating current power distribution system at said distant station, a direct-current-actuated relay at said distant station connected in circuit with said control wire and adapted to operate said switch, means at said control station for impressing direct current on said control wire to thereby control the operation of said relay at the distant station, and means rendering the impedance of the actuating circuit of said relay sufficiently greater for alternating current than for direct current to prevent alternating currents in the control wire due to induced voltages or abnormal conditions from affecting proper control of the load.

ROLLIN N. CONWELL.
ALBERT S. BROOKES.